US005547450A

United States Patent [19]

Matsumoto et al.

[11] Patent Number: 5,547,450

[45] Date of Patent: Aug. 20, 1996

[54] HEARTH ROLLER WITH SUPPRESSED HEAT CROWN

[75] Inventors: Yoshiro Matsumoto, Sanda; Kazumi Isaka, Amagasaki; Masaaki Mizuguchi, Joetsu; Yoshimitsu Oshima, Joetsu; Osamu Takatsu, Joetsu, all of Japan

[73] Assignee: Sumitomo Metal Industries, Ltd., Osaka, Japan

[21] Appl. No.: 201,095

[22] Filed: Feb. 24, 1994

Related U.S. Application Data

[63] Continuation of Ser. No. 18,404, Feb. 17, 1993, abandoned.

[30] Foreign Application Priority Data

Mar. 31, 1992 [JP] Japan .................................... 4-108911

[51] Int. Cl.[6] .................................................. B23P 15/00

[52] U.S. Cl. ................................ 492/54; 492/49; 492/53

[58] Field of Search .................................. 492/53, 54, 49

[56] References Cited

U.S. PATENT DOCUMENTS 4,888,464 12/1989 Shibata et al. ............................ 492/54

5,083,353 1/1992 Jacques .................................... 492/54

FOREIGN PATENT DOCUMENTS 9129757 7/1984 Japan ........................................ 492/54

9030484 7/1984 Japan ........................................ 492/54

9178111 10/1984 Japan ........................................ 492/54

0027408 2/1985 Japan ........................................ 492/54

0121013 6/1985 Japan ........................................ 492/54

0135588 7/1985 Japan ........................................ 492/54

61-210129 9/1986 Japan .

63-65016 3/1988 Japan .

2-301520 12/1990 Japan .

3-082718 4/1991 Japan .

4-056733 2/1992 Japan .

4-247821 9/1992 Japan .

4-285132 10/1993 Japan .

*Primary Examiner*—Irene Cuda

*Attorney, Agent, or Firm*—Burns, Doane, Swecker & Mathis, L.L.P.

[57] ABSTRACT

A hearth roller has an outer sleeve which constitutes a hearth roller barrel is disclosed. An inner sleeve is fitted into the outer sleeve and innermost sleeve is fitted into the inner sleeve. The ends of the inner sleeve in the axial direction are positioned inwardly and separated from each of the ends of the outer sleeve and are sealed by a metal. The inner sleeve has substantially the same linear expansion coefficient as the outer sleeve but exhibits higher thermal conductivity.

17 Claims, 7 Drawing Sheets

HEARTH ROLLER WITH SUPPRESSED HEAT CROWN

This application is a continuation of application Ser. No. 08/018,404, field Feb. 17, 1993, now abandoned.

BACKGROUND OF THE INVENTION

The present invention relates to hearth rollers for conveying metal strips, and more particularly to hearth rollers having a suppressed heat crown in an area where a metal strip contacts the roller so that the roller can convey metal strips at a high temperature in a stable manner.

In processing lines such as those for continuous heat treating furnaces (e.g., continuous annealing furnaces) hearth rollers have been employed to convey metal strips (sometimes referred to as "strip" hereunder). In such conventional hearth rollers, a predetermined initial crown is provided in order to convey strips in a stable manner.

In a continuous annealing furnace, for example, hearth rollers provided within the furnace must carry metal strips having a variety of temperatures, widths, and thicknesses, and a heat crown is inevitably generated so that the initial roll crown of the roller cannot be maintained.

There are many problems caused by variation in roll crown. When the roll crown is excessive, buckling of strips referred to as "heat buckling" or "cooling buckling") occurs, resulting in troubles in conveying metal strips as well as degradation in the quality of the product strips. When the roll crown is too small, the centering effect is weakened, resulting in meandering of strips on the rollers.

One solution to such problems caused by the occurrence of heat crown is, as is disclosed in Japanese Patent Application Unexamined Specification No.61-210129/1986, to employ hearth rollers having a crown which can adjusted mechanically. As shown in FIG. 13, a tapered surface 10 formed on an inner portion of the hearth roller 9 engages with an adjusting member 12. The position of the adjusting member 12 is movable along the longitudinal axis of the roller by an adjusting means 14 provided outside the roller. The roll crown can be adjusted by controlling the axial position of the adjusting member 12 so that a sleeve 16 can be deformed. A variation of the roll crown is caused by the occurrence of a heat crown, which is caused by the occurrence of a variation in temperatures of the strip in the widthwise and longitudinal directions. In this hearth roller, such roll crown variations can be mechanically offset by the deformation of the sleeve caused by the movement of the tapered surface, and a given level of crown can be maintained.

Japanese Patent Application Unexamined Specification No. 63-65016/1988 discloses another hearth roller which can prevent a heat crown by obtaining a uniform thermal distribution throughout the roller. Such hearth rollers, as shown in FIG. 14, contain a molten metal 20 as a thermal medium within the roller 22 so that the temperature deviation in the axial direction of the roller barrel 24 can be diminished to suppress the occurrence of heat crown.

However, such hearth rollers as described above cannot prevent occurrence of heat crown effectively.

Namely, the hearth roller shown in FIG. 13 requires a control system which can estimate or measure a change in heat crown whenever it occurs so as to maintain a predetermined roll crown. Such a control system adds to costs. There are still other problems with respect to lubrication, endurance, and the like of a variable crown mechanism when a hearth roller is used in a high temperature atmosphere, such as in a continuous annealing furnace.

On the other hand, a hearth roller shown in FIG. 14 essentially utilizes the thermal content of the thermal medium. Since the thermal content is equal to the product of the specific heat and the mass, it is more advantageous to use a molten metal than a molten salt in order to make the temperatures of the roller uniform in the widthwise direction. This is because metals have a larger mass, i.e., a higher density than molten salts. However, when a metal is used, the mass distribution of the roller is not uniform, and centrifugal force acting on the molten metal causes vibration of the roller. In order to prevent the roller from vibrating it is necessary to employ additional equipment such as bearings, which adds to costs. In the case of a molten salt, its effectiveness at producing uniformity of the roller temperature is degraded to some extent but costs are reduced compared with when a molten metal is used.

SUMMARY OF THE INVENTION

An object of the present invention is to provide hearth rollers which can avoid such problems of the prior art, and which do not require any specific control system, but which can maintain a predetermined initial crown in order to stably convey metal strips regardless of changes in carrying conditions of the metal strips.

Another object of the present invention is to provide hearth rollers with a suppressed heat crown in which a buffer effect is strengthened by increasing the heat transfer capability of the roller in order to offset changes in the temperature distribution in the widthwise direction which occur when metal strips having different widths are conveyed continuously.

Still another object of the present invention is to provide less expensive hearth rollers with a simple structure which are corrosion resistant and strong enough to withstand high temperature conditions at 1000° C. such as experienced when strips are conveyed on the hearth rollers.

The inventor of the present invention found that a heat crown is mainly caused by a temperature gradient in the barrel of a hearth roller, i.e., in the hearth roller body, and that such a heat crown can be eliminated by achieving a rapid heat transfer through the body of a hearth roller to diminish such a temperature gradient while ensuring high temperature strength and corrosion resistance.

The present invention is a hearth roller comprising an outer sleeve which constitutes a hearth roller barrel and an inner sleeve fitted into the outer sleeve. The ends of the inner sleeve in the axial direction are positioned inwardly and separated from each of the ends of the outer sleeve, and the inner sleeve exhibits higher thermal conductivity than the outer sleeve. Preferably the inner sleeve has substantially the same linear expansion coefficient as the outer sleeve.

In another aspect, a hearth roller according to the present invention comprises an outer sleeve which constitutes a hearth roller barrel, an inner sleeve fitted into the outer sleeve and an innermost sleeve fitted into the inner sleeve. The ends of the inner sleeve in the axial direction are positioned inwardly and separated from each of the ends of the outer sleeve and are sealed by a metal. The inner sleeve has substantially the same linear expansion coefficient as the outer sleeve but exhibits higher thermal conductivity than the outer sleeve.

DESCRIPTION OF THE PREFERRED EMBODIMENTS

Figure 1A:
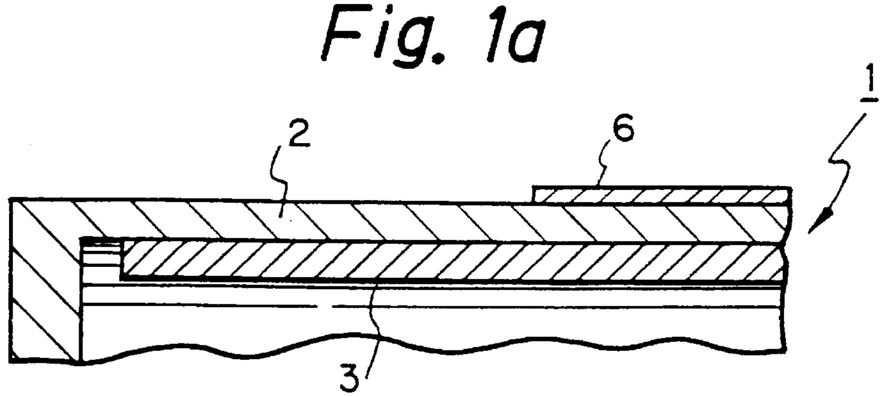
FIG. 1*a* is a partial sectional view of a hearth roller of the present invention.

FIG. 1*a* is a schematic sectional view of a portion of a hearth roller of the present invention. The hearth roller 1 comprises a hearth roller barrel (outer sleeve) 2, and a metallic sleeve (inner sleeve) 3. The metallic sleeve 3 has substantially the same linear expansion coefficient as the outer sleeve but exhibits higher thermal conductivity than the outer sleeve. It is fitted to the inner surface of the outer sleeve by means such as a shrink fit or duplex casting.

Figure 1B:
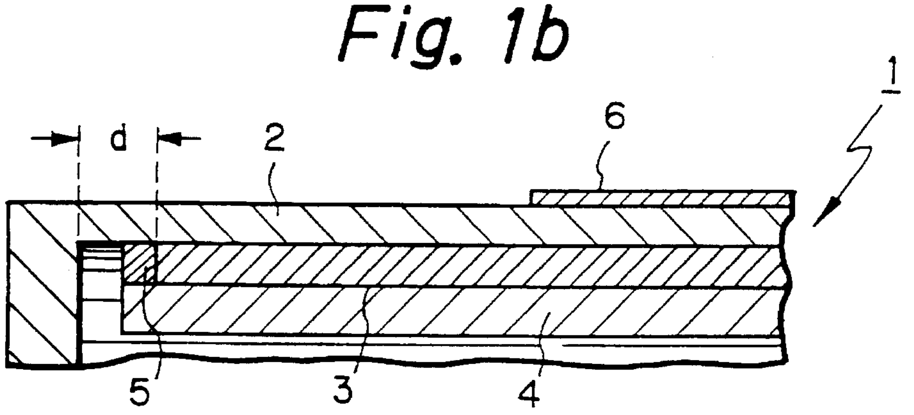
FIG. 1*b* is a partial sectional view of another embodiment of a hearth roller of the present invention.

FIG. 1*b* is a schematic sectional view of a portion of another embodiment of a hearth roller of the present invention. The hearth roller 1 comprises a hearth roller barrel (outer sleeve) 2, a metallic sleeve (inner sleeve) 3, and an innermost sleeve 4. Rings 5 are provided at the both ends of the inner sleeve 3. The metallic sleeve 3 has substantially the same linear expansion coefficient as the outer sleeve but exhibits higher thermal conductivity. It is fitted to the inner surface of the outer sleeve by means such as a shrink fit or duplex casting. The innermost sleeve 4 is fitted to the inner surface of the metallic sleeve 3 by means such as thermal insertion, i.e., a shrink fit. A metal strip 6 is conveyed while being carried on the outer sleeve 2.

The double wall roll of the present invention may be manufactured by means of a duplex casting method. The duplex casting method comprises the steps of casting an outer sleeve in a centrifugal machine and then casting an inner sleeve onto the outer sleeve while the metal of the outer sleeve is in the middle of solidification so that the outer sleeve made of a heat resistant steel and the inner sleeve made of copper, for example, can be firmly bonded chemically and mechanically.

The duplex casting may be carried out in a conventional manner, and it is important to determine when the molten metal of the inner sleeve should be cast. The timing of casting the inner sleeve, i.e., when the outermost surface of the outer sleeve is in a state of semi-solidification, can be determined by considering the casting temperature, the cooling system, and the cooling rate of the outer sleeve. In order to prevent oxidation of molten metal, a flux may be supplied to the surface of the molten metal. High temperature insulation may be added to the surface of the molten metal.

Furthermore, when the melting point of the inner sleeve metal is higher or close to that of the outer sleeve metal, during solidification of the inner sleeve metal the two metals are mixed excessively, resulting in a variation in thickness and metal composition of the outer and inner sleeves. According to a preferred embodiment of the present invention in which the outer sleeve is made of a heat resistant steel and the inner sleeve is made of copper, no such problem occurs, since copper has a melting point about 300° C. lower than the heat resistant steel.

The ends of the inner sleeve 3 in the axial direction are positioned inwardly and separated from each of the ends of the outer sleeve 2 and are sealed with a metal member of a weld metal or a ring made of the same metal as the innermost sleeve 4. Namely, the inner sleeve 3 is totally isolated from the surrounding atmosphere. The inner sleeve 3 is made of a single piece, but it may be a multi-piece type divided into pieces in the axial direction.

The axial end of the inner sleeve 3 is positioned inwardly from the axial end of the outer sleeve 2 which constitutes a hearth roller barrel. The distance d between the two ends is not restricted to a specific one, so long as thermal streams are interrupted thoroughly between them. Usually the distance "d" is about 1 mm.

The outer sleeve 2 and the innermost sleeve 4 may be made of the same or different metals. Usually it is desirable that these sleeves be made of the same metal. On the other hand, the inner sleeve 3 is made of a metal different from that of these sleeves and exhibits improved thermal conductivity.

Usually a hearth roller is made of a stainless steel. This means that the sleeve 2 is made of a stainless steel. In this case, it is preferable from consideration of the thermal properties and material costs that the inner sleeve be made of copper. The innermost sleeve 4 and the ring 5 are also preferably made of stainless steel.

It is also possible for the outer sleeve 2, the innermost sleeve 4 and the ring 5 to be made of a heat resistant steel and for the inner sleeve 3 to be made of aluminum or silver.

In summary, in order to achieve the maximum merits of the present invention it is desirable that the outer sleeve 2, the innermost sleeve 4 and the ring 5 be made of a metal which exhibits improved heat resistance and that the inner sleeve 3 be made of a metal having improved thermal conductivity.

In the case in which the inner sleeve is made of copper, the service temperature thereof is up to about 500° C. The corrosion resistance and strength of a copper inner sleeve are adequate. However, when hearth rollers are used at a temperature around 1000° C., which is near to the melting point of copper, the strength of copper is decreased markedly and oxidation of copper takes place. Thus, it is desirable that the inner sleeve be sealed in an inert atmosphere or vacuum, but the service life for a hearth roller comprising an outer sleeve having a thickness which has been reduced for the purposes of saving energy and economy is markedly reduced.

Next, heat conduction from a metal strip and formation of heat crown caused by such heat conduction will be described in conjunction with an example in which the hearth rollers are installed in a continuous annealing furnace. In this example, hearth rollers are placed in an atmosphere at a relatively low temperature and a metal strip at a high temperature is running on the hearth rollers.

Figure 4A:
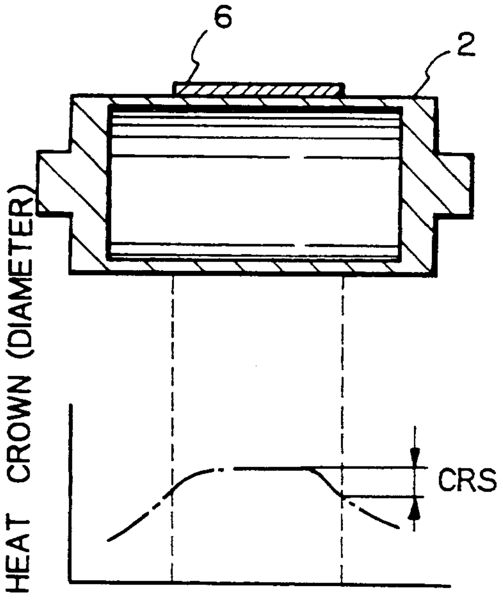
FIG. 4*a* is a graph showing the heat crown of a hearth roller of the prior art.

In the case of a hearth roller having a conventional structure, i.e., hearth rollers without inner sleeves 3 and 4, a temperature gradient is found in an area near the edges of the strip, resulting in formation of heat crown as shown in FIG. 4*a*.

Figure 4B:
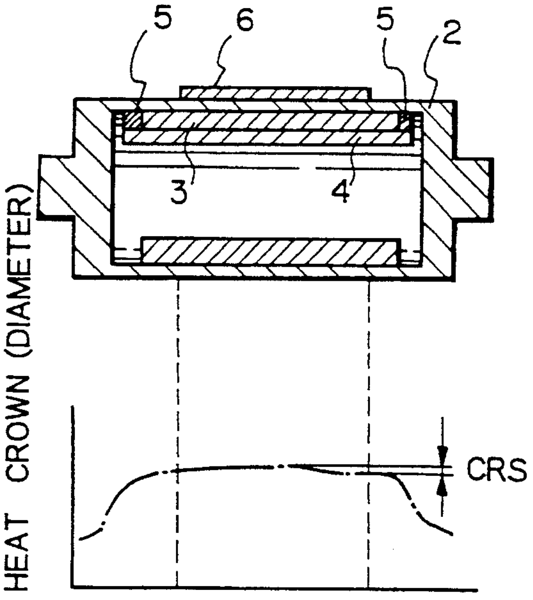
FIG. 4*b* is a graph showing the heat crown of the hearth roller of the present invention illustrated in FIG. 1*b;*
Figure 5A:
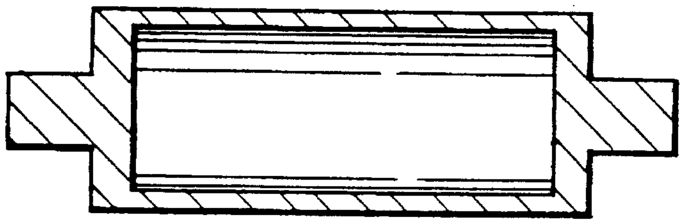
FIG. 5*a* is an illustration of the dimensions of a standard hearth roller.
Figure 5B:
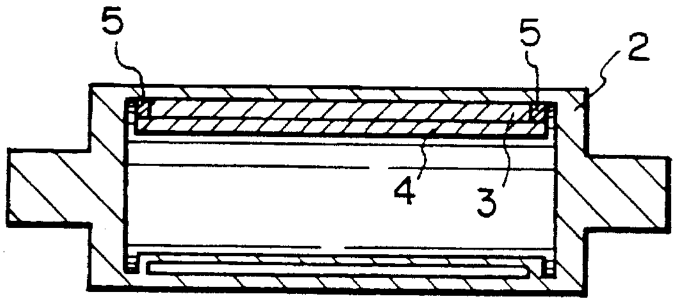
FIG. 5*b* is an illustration of an embodiment of the hearth roller of the present invention.

On the other hand, according to the present invention, as shown in FIG. 4*b*, the inner sleeve 3 made of copper is fitted into the outer sleeve 2 with the axial ends of the inner sleeve 3 being separated from those of the outer sleeve 2. The inner sleeve 3 is also isolated from the surrounding atmosphere by the innermost sleeve 4 and the ring 5. When a metal strip is conveyed under the same conditions as in FIG. 4*a*, heat conduction in the axial direction is promoted and a temperature gradient in the marginal areas is diminished, resulting in disappearance of heat crown. In the figure, the abbreviation "CRS" stands for the amount of heat crown per unit width of strip.

Furthermore, in the embodiment shown in FIG. 4*b*, since the inner sleeve made of copper is sealed from the outside, even if the copper is melted down, the strength of the hearth roller can be ensured by the outer sleeve which is made of a heat resistant steel, e.g., stainless steel. Oxidation of the copper can also be prevented because the inner sleeve is sealed. It is desirable, in this case, too, to place the inner sleeve in an inert gas or vacuum atmosphere. Thus, the hearth roller with improved properties of corrosion resistance can be used at a temperature of about 1000° C.

The thickness of the inner sleeve 3 is not restricted to a specific one, but it is preferable from the standpoint of improving heat conduction that the thickness of the inner sleeve 3 be larger than that of the outer sleeve 2. Usually the thickness of the inner sleeve is 10–30 mm.

The total thickness of the outer sleeve 2 and the innermost sleeve 4 is about 15–30 mm, which is substantially the same as that of the outer sleeve of a conventional roller designed taking creep strength and the like into consideration.

When the outer sleeve 2 and the innermost sleeve 4 are made of stainless steel and the inner sleeve is made of copper, the linear expansion coefficients for each of the sleeves are substantially the same. The formation of thermal stress is suppressed even if the temperature of the roller or metal strip is varied, and the proper fit among all these sleeves can be maintained while preventing tensile thermal stresses which might cause creep and the like.

The present invention will be further described in conjunction with working examples, which are presented merely for illustrative purposes.

EXAMPLE 1

In this example, a dual sleeve pipe was manufactured using a centrifugal casting method of the lateral type, in which an outer sleeve of a heat resistant steel having a steel composition shown in Table 1 was first cast and then a copper layer was also cast onto the inner surface of the outer sleeve as an inner sleeve while the inner surface was in the middle of solidification. The pipe measured 210 mm in outer diameter, 30 mm in thickness (the thickness of the outer sleeve was 15 mm and that of the inner sleeve was 15 mm), and 3200 mm in length.

TABLE 1

| | Chemical Composition (wt %) | | | | | | | | | | Melting Point | 30–800° C. Thermal Expansion Coefficient | Pouring Temperature |
|---|---|---|---|---|---|---|---|---|---|---|---|---|---|
| | C | Si | Mn | P | S | Cr | Ni | Mo | N | Cu | (°C.) | ($10^{-6}$/°C.) | (°C.) |
| Outer Sleeve | 0.32 | 0.86 | 0.91 | 0.027 | 0.009 | 24.56 | 12.52 | 0.19 | 0.09 | 0.16 | 1380 | 18.0 | 1550 |
| Inner Sleeve | — | — | — | — | — | — | — | — | — | 99.98 | 1083 | 18.2 | 1200 |

Figure 2:
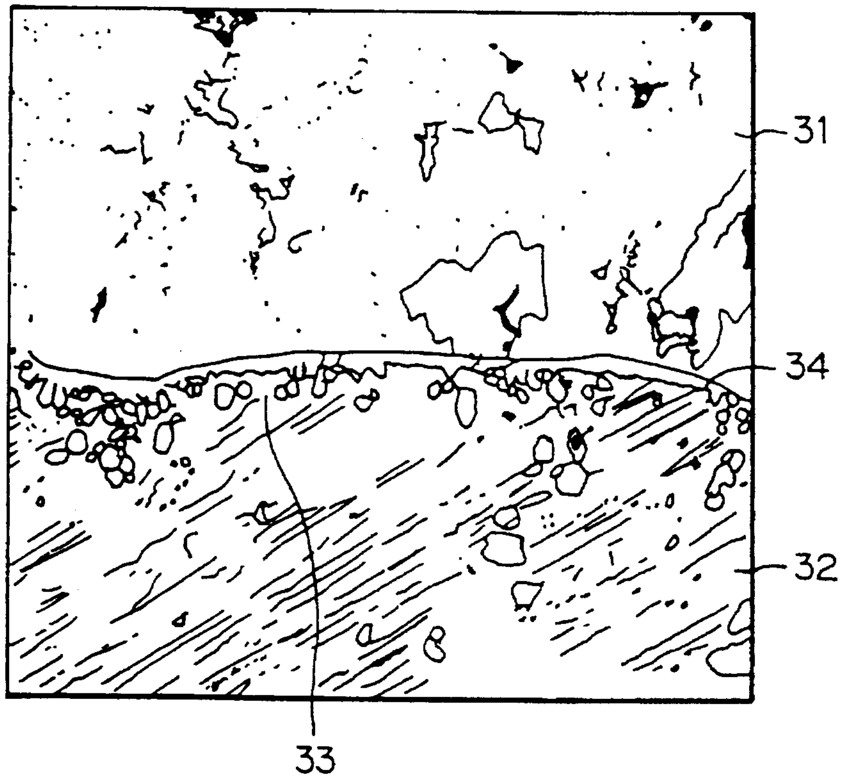
FIG. 2 is a sectional view (×200) of an interface area of the dual sleeve.

FIGS. 2 is a sectional view (×200) of the dual sleeve pipe which was manufactured in accordance with the above described method. It can be seen that the outer sleeve 31 and the inner sleeve 32 were bonded via a dendrite layer 33. The presence of a thin fused layer 34 is effective for achieving a firm bond between the two sleeves from chemical and mechanical standpoints. There was no excess comingling or deviation in thickness for the inner sleeve.

A small test piece cut in a radial direction was subjected to a tensile test so as to determine the tensile strength of the bonding area. The test results are shown in Table 2, from which it is noted that the strength of the bonding area was superior to that of the inner or outer sleeves.

TABLE 2

| Tensile Strength in Radial Direction | Rupture Point | Test Piece (mm) |
|---|---|---|
| 23 kgf/mm$^2$ | Copper Sleeve | Diameter: 6<br>Parallel Length: 14 |

Figure 3:
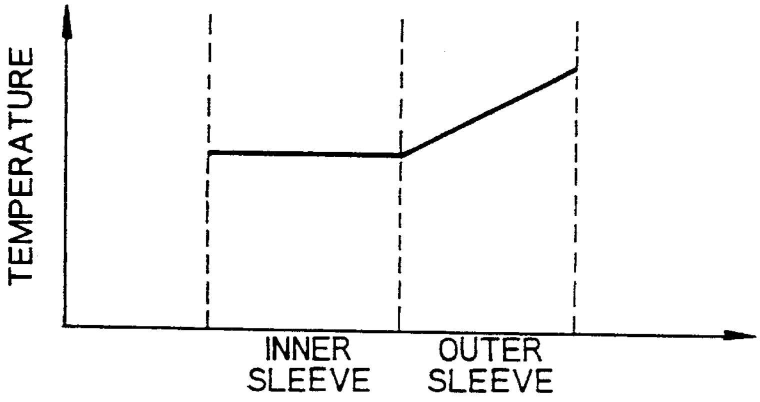
FIG. 3 is a schematic illustration of a temperature gradient.

The outer and inner sleeve of the centrifugal cast, dual sleeve pipe was machined to remove an oxide film. The resulting dual sleeve pipe was then subjected to a thermal transfer test, in which the inner sleeve surface was water-cooled and the outer sleeve surface was heated. A temperature gradient between the outer and inner sleeves was measured with a radiation pyrometer. A typical result is schematically shown in FIG. 3. As is apparent, heat transfer from the outer sleeve to the inner sleeve was smooth, and there was no interruption of the temperature gradient.

EXAMPLE 2

FIGS. *5a* and *5b* show the shapes and dimensions (mm) of the hearth rollers used in this example.

FIG. *5a* is a schematic sectional view of a conventional roller made of a heat resistant stainless steel. This roller represents a comparative .example.

FIG. *5b* shows a hearth roller of the present invention. The inner sleeve 3 made of copper is fitted into the outer sleeve 2, i.e., the hearth roller barrel made of heat resistant stainless steel, and the innermost sleeve 4 made of heat resistant stainless steel is then fitted into the inner sleeve by shrink fit. Both ends of the inner sleeve 3 are sealed by fitting the ring 5 made of heat resistant stainless steel to the outer and innermost sleeves by welding.

Substantially the same effectiveness of the present invention with respect to prevention of heat crown can be obtained when an inner sleeve 3 of the multi-piece type, i.e., a combination of a plurality of rings is used as with the single piece type. However, for ease of assembly in the production line, the single piece type is preferred.

A steel strip used in this example was an annealed steel strip having a thickness of 0.15 mm and a width of 280 mm. A heat crown formed while conveying the metal strip was measured during the conveying process with a measuring device of the contact type.

A model test simulating employment of the hearth roller of the present invention in a cooling zone of a continuous annealing furnace was carried out by conveying the strip in an atmosphere kept at 900° C. on the hearth rollers. The strip was previously heated to a given temperature, e.g., 1000° C. This test will be referred to as "Model Test I".

Figure 6:
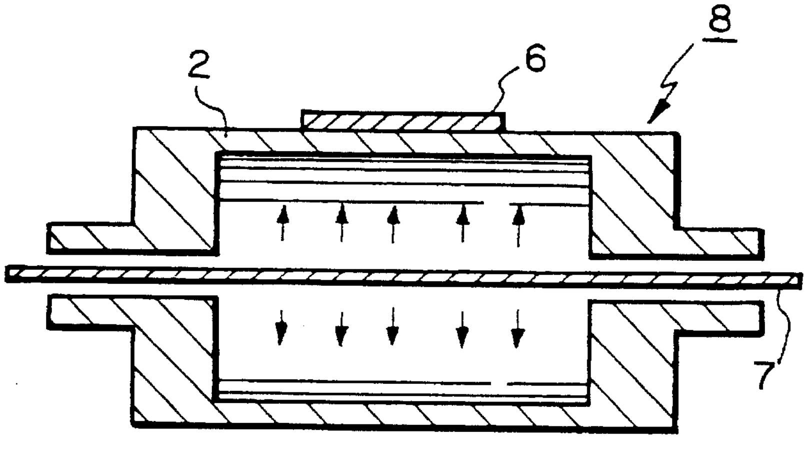
FIG. 6 is an illustration of heating a hearth roller.

On the other hand, another model test simulating employment of the hearth roller of the present invention in a heating zone of a continuous annealing furnace was carried out, as shown in FIG. 6, by conveying the strip on hearth rollers having the outer sleeve 2 heated to about 1000° C. by means of an infrared heater 7 provided within the hearth roller 8. The strip was previously heated to a given temperature, e.g., 900° C. This test will be referred to as "Model Test II".

In both cases, since the conveying was carried out for evaluating heat conduction, the roller had no initial crown.

Figure 7:
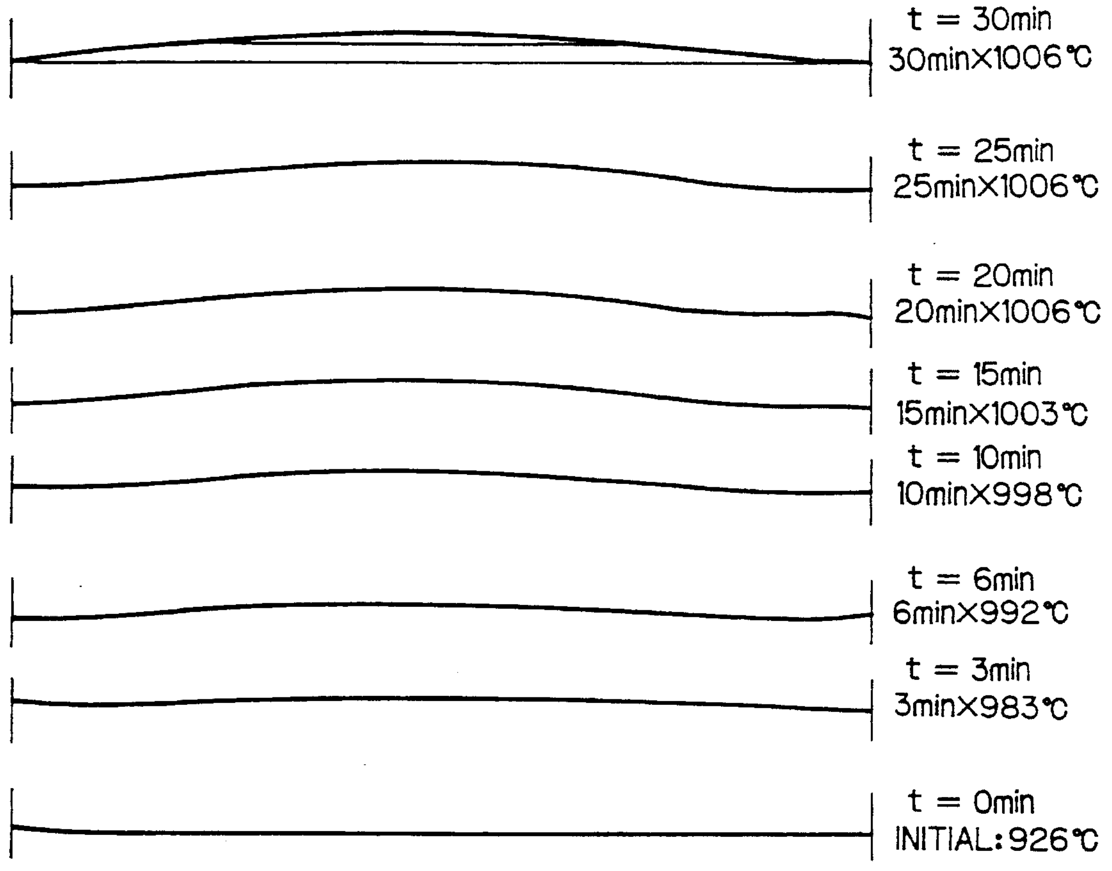
FIG. 7 shows graphs of changes in a heat crown as time elapses.

FIG. 7 is a graph of formation of heat crown with respect to elapsed time for the conventional hearth roller in Model Test I. In this example, the temperature of the strip at the inlet of the roller was about 1060° C., and the heat crown reached a constant level after about 30 minutes.

In the following test results, the heat crown was determined while conveying the strip on the hearth rollers. The indicated heat crown is the value when the heat crown reached a constant level.

Figure 8:
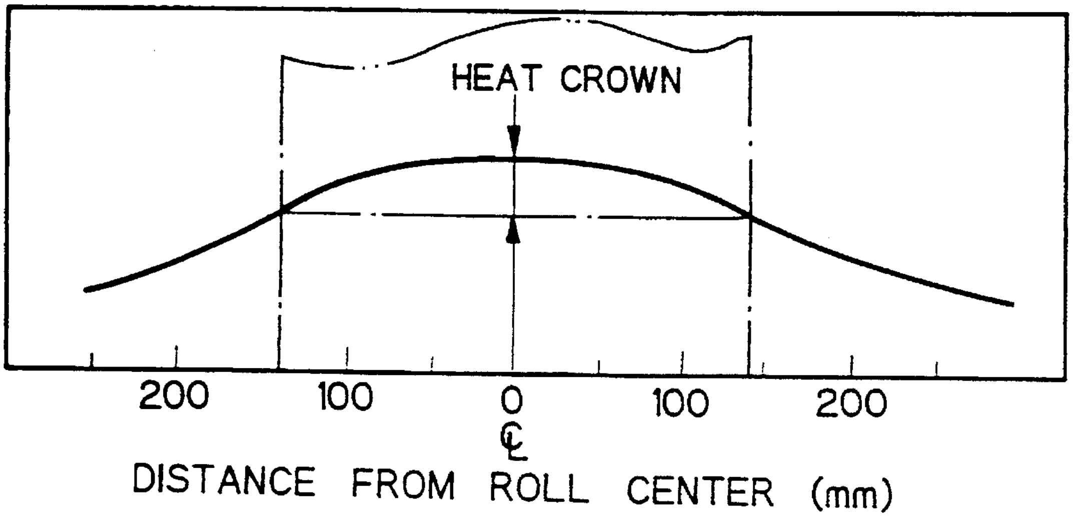
FIG. 8 is an illustration of a heat crown of a conventional hearth roller used in a cooling zone of a continuous annealing furnace.
Figure 9:
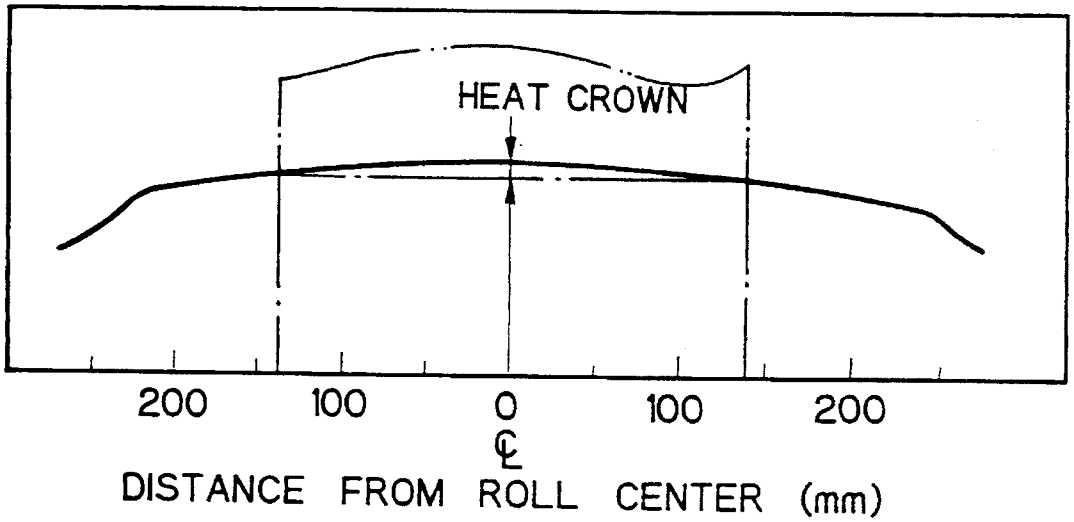
FIG. 9 is an illustration of a heat crown of a hearth roller of the present invention used in a cooling zone of a continuous annealing furnace.

FIGS. 8 and 9 are graphs showing heat crown for the conventional hearth roller and for the hearth roller of the present invention in Model Test I.

It is clear that according to the present invention, the CRS decreased from 62 micrometers to 16 micrometers, and the gradient of heat crown in the axial direction was smooth.

Figure 10:
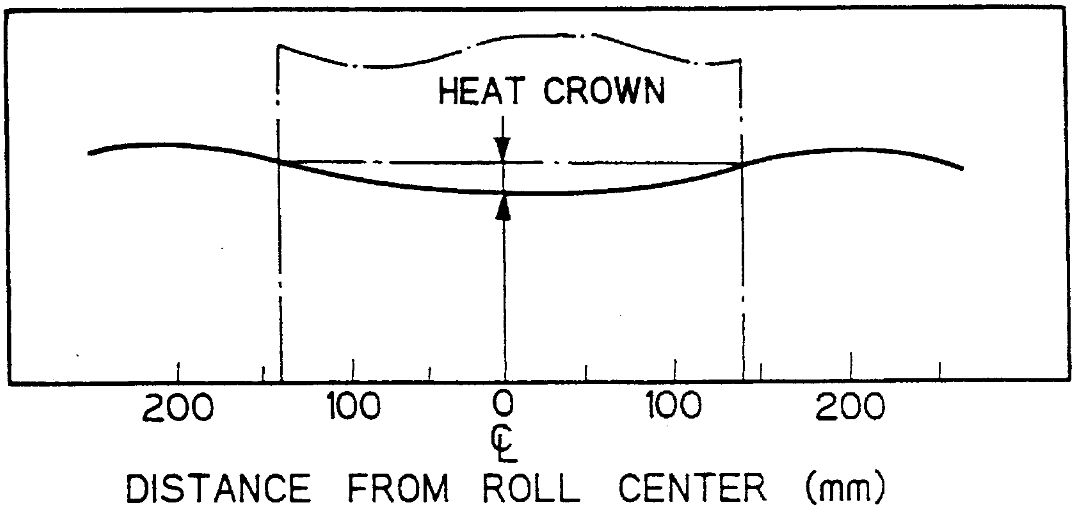
FIG. 10 is the same as FIG. 6 except that the roller is used in a heating zone.
Figure 11:
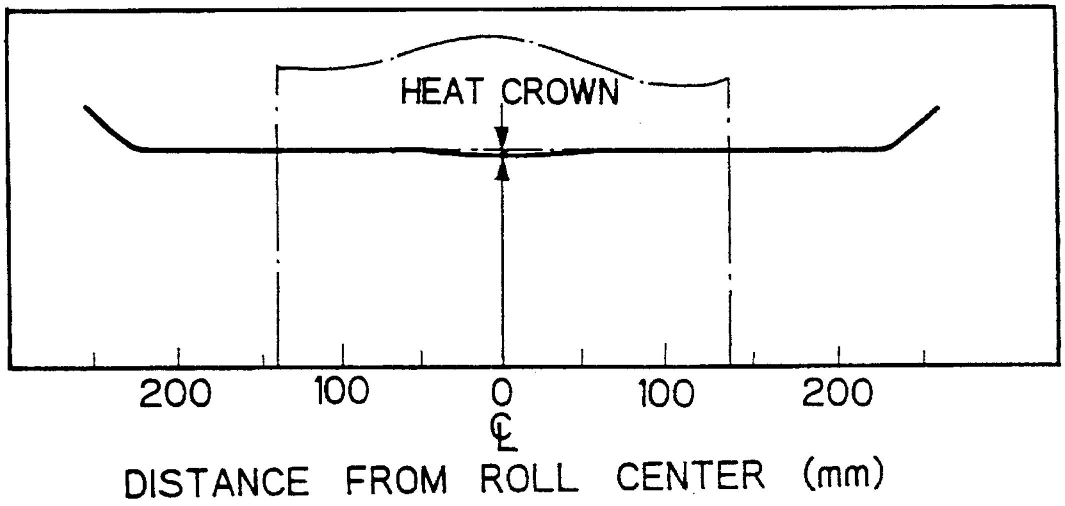
FIG. 11 is the same as FIG. 7 except that the roller is used in a heating zone.

FIGS. 10 and 11 are graphs showing the heat crown of the conventional hearth roller and the hearth roller of the present invention in Model Test II. The temperature of the surface of the hearth roller at the center in the axial direction was kept at about 980° C. by adjusting the power of the heater 7.

It is clear that according to the present invention the CRS decreased from 33 micrometers to 2 micrometers.

Thus, according to the present invention the heat crown (CRS) could be markedly reduced by about 74% in the cooling zone and about 94% in the heating zone. In addition, according to the present invention the gradient of heat crown in the axial direction was smooth, which is very advantageous from a practical viewpoint. Problems in operation during conveying strips occur mainly when the width of strips is changed, particularly when the width of strips being conveyed changes from narrow to broad. This is because there is a marked increase in the CRS. Thus, according to the present invention such troubles can be eliminated completely.

Figure 12:
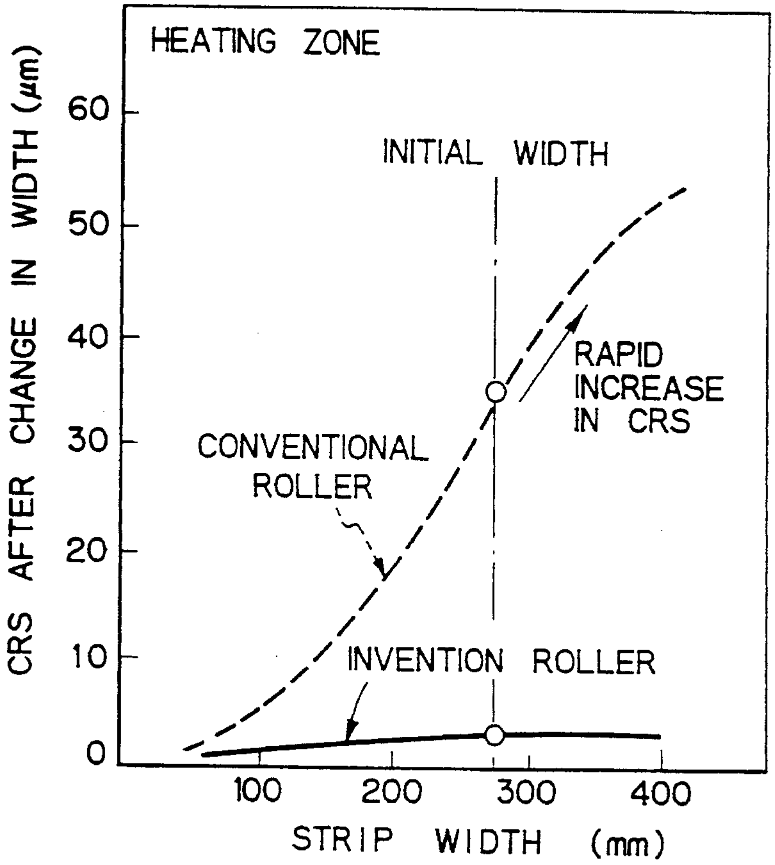
FIG. 12 shows graphs of changes in a heat crown when the width of a strip is varied and graphs of changes in CRS after the width is varied.
Figure 13:
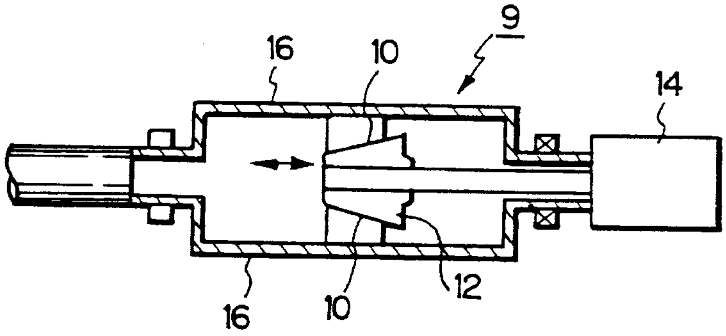
FIG. 13 is an illustration of a hearth roller of the prior art equipped with a heat crown adjusting mechanism.
Figure 14:
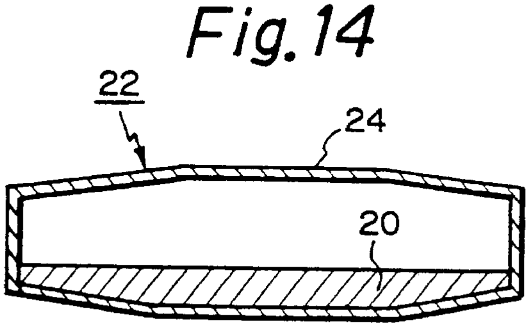
FIG. 14 is an illustration of another hearth roller of the prior art.

FIG. 12 is a graph showing what changes in the CRS occur immediately after the width of a strip is switched from the initial width of 280 mm to a smaller or larger one for the conventional hearth roller and for the hearth roller of the present invention in Model Test II.

As can be seen from FIG. 12, in the case of the conventional hearth roller, the CRS varied in a wide range, but in the case of the present invention the CRS was maintained at substantially the same level even when the width of a strip was changed to a larger or smaller one.

Thus, according to the present invention, problems which occur in switching a strip to a different width can be eliminated completely.

It is also to be stressed that even for a hearth roller comprising an inner sleeve made of copper and outer and innermost sleeves and a ring each made of a heat resistant stainless steel, the resulting hearth roller can withstand a temperature of 1000° C. with improved corrosion resistance, so that the hearth roller can be used continuously at 1200° C. for over 500 hours.

What is claimed:

1. A hearth roller having shaft portions extending from opposite ends of a barrel portion, the barrel portion comprising an outer sleeve wherein the outer sleeve extends between opposite ends of the barrel portion and has a diameter larger than any other part of the hearth roller, the barrel portion further comprising an inner sleeve fitted into the outer sleeve, the ends of the inner sleeve in the axial direction being positioned inwardly and separated from each of the ends of the outer sleeve, and the inner sleeve exhibiting higher thermal conductivity than the outer sleeve.

2. A hearth roller as recited in claim 1 wherein the inner sleeve is shrink fit into the outer sleeve.

3. A hearth roller as recited in claim 1 wherein the inner sleeve is fit into the outer sleeve by duplex casting.

4. A hearth roller as recited in claim 1 wherein the inner sleeve has substantially the same linear expansion coefficient as the outer sleeve.

5. A hearth roller as recited in claim 1 wherein the inner sleeve is made of copper and the outer sleeve is made of a heat resistant stainless steel.

6. A hearth roller having shaft portions extending from opposite ends of a barrel portion, the barrel portion comprising an outer sleeve wherein the outer sleeve extends between opposite ends of the barrel portion and has a diameter larger than any other part of the hearth roller, the barrel portion further comprising an inner sleeve fitted into the outer sleeve and an innermost sleeve fitted into the inner sleeve, the ends of the inner sleeve in the axial direction being positioned inwardly and separated from each of the ends of the outer sleeve and being sealed by a metal extending between the outer sleeve and the inner sleeve, and the inner sleeve having substantially the same linear expansion coefficient as that of the outer sleeve but exhibiting higher thermal conductivity than the outer sleeve.

7. A hearth roller as recited in claim 6 wherein the inner sleeve is shrink fit into the outer sleeve and the innermost sleeve is shrink fit into the inner sleeve.

8. A hearth roller as recited in claim 6 wherein the inner sleeve is fit into the outer sleeve and the innermost sleeve is fit into the inner sleeve by duplex casting.

9. A hearth roller as recited in claim 6 wherein the outer sleeve and innermost sleeve are made of the same metal.

10. A hearth roller as recited in claim 6 comprising rings sealing the ends of the inner sleeve, and the rings and the innermost sleeve are made of the same metal.

11. A hearth roller as recited in claim 6 wherein the inner sleeve is made of copper, and the outer sleeve and innermost sleeve are made of a heat resistant stainless steel.

12. A hearth roller as recited in claim 6 wherein the inner sleeve is sealed in an inert atmosphere.

13. A hearth roller as recited in claim 6 wherein the inner sleeve is of the single piece type.

14. A hearth roller comprising an outer sleeve which constitutes a hearth roller barrel, characterized in that the hearth roller further comprises an inner sleeve fitted into the outer sleeve, the ends of the inner sleeve in the axial direction are positioned inwardly and separated from each of the ends of the outer sleeve, and the inner sleeve exhibits further improved thermal conductivity, the outer sleeve including a cylindrical wall and end walls extending radially inwardly from the cylindrical wall, each of the end walls being separated from a

15. A hearth roller as recited in claim 6, wherein the outer sleeve includes a cylindrical wall and end walls extending radially inwardly from the cylindrical wall, each of the end walls being separated from a respective one of the ends of the inner sleeve by a distance sufficient to promote heat conduction in the axial direction along the cylindrical wall and minimize a heat crown resulting from contact between the cylindrical wall and a hot metal strip conveyed by the hearth roller.

16. A hearth roller as recited in claim 1, wherein an outer periphery of the inner sleeve is in direct contact with an inner periphery of the outer sleeve, the inner sleeve being made of copper and the outer sleeve being made of steel, the inner sleeve and outer sleeve being bonded together via a rendrite layer.

17. A hearth roller as recited in claim 6, wherein an outer periphery of the inner sleeve is in direct contact with an inner periphery of the outer sleeve, the inner sleeve being made of copper and the outer sleeve being made of steel, the inner sleeve and outer sleeve being bonded together via a dendrite layer.

* * * * *